(12) United States Patent
Eriksson et al.

(10) Patent No.: US 9,231,805 B2
(45) Date of Patent: Jan. 5, 2016

(54) DEVICE FOR CARRIER PHASE RECOVERY

(75) Inventors: Thomas Eriksson, Gothenburg (SE); Mats Rydstrom, Billdal (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/413,478

(22) PCT Filed: Jul. 9, 2012

(86) PCT No.: PCT/EP2012/063386
§ 371 (c)(1),
(2), (4) Date: Jan. 8, 2015

(87) PCT Pub. No.: WO2014/008914
PCT Pub. Date: Jan. 16, 2014

(65) Prior Publication Data
US 2015/0215145 A1    Jul. 30, 2015

(51) Int. Cl.
*H04B 15/00* (2006.01)
*H04L 27/227* (2006.01)
(Continued)

(52) U.S. Cl.
CPC ...... *H04L 27/2278* (2013.01); *H04L 25/03343* (2013.01); *H04L 25/03993* (2013.01); *H04L 27/0014* (2013.01); *H04L 27/2075* (2013.01);
(Continued)

(58) Field of Classification Search
CPC .......... H04L 2027/0018; H04L 25/03343; H04L 27/367; H04L 27/3872; H04L 2027/0067; H04L 25/03993; H04L 27/2278; H04B 10/6165
See application file for complete search history.

(56) References Cited

U.S. PATENT DOCUMENTS

2001/0036228 A1*  11/2001  Skafidas et al. .............. 375/232
2006/0229868 A1*  10/2006  Bozkurt et al. ............... 704/206
(Continued)

FOREIGN PATENT DOCUMENTS

GB    2 373 420 A    9/2002

OTHER PUBLICATIONS

PCT International Search Report, mailed May 21, 2013, in connection with International Application No. PCT/EP2012/063386, all pages.

(Continued)

*Primary Examiner* — Daniel Washburn
*Assistant Examiner* — Amneet Singh
(74) *Attorney, Agent, or Firm* — Patent Portfolio Builders, PLLC

(57) ABSTRACT

A transmitter comprising a baseband modulator arranged to modulate a complex baseband signal and to output a complex modulated signal $x_{in}(n)$ with amplitude g and phase q, i.e. $x_{in}(n)=g(n)e^{jq(n)}$, to the input port of a filter, the filter in turn having its output coupled to a transmit unit, said filter being arranged to output a filtered complex output signal $x_{out}(n)$ with amplitude g but phase m, i.e. $x_{out}(n)=g(n)e^{jm(n)}$, so that the filter is arranged to affect the phase but not the amplitude of its input signal. The filter is arranged to have as its transfer function for the phase of its input signal the z-transform $F(z)=1+wz^{-1}$, where w is a weighting function whose value is determined by means of the additive noise autocorrelation, the phase noise autocorrelation and the signal amplitude of $x_{in}$.

7 Claims, 10 Drawing Sheets

(51) Int. Cl.
   *H04L 27/00* (2006.01)
   *H04L 27/20* (2006.01)
   *H04L 27/36* (2006.01)
   *H04L 27/38* (2006.01)
   *H04L 25/03* (2006.01)

(52) U.S. Cl.
   CPC .......... *H04L 27/367* (2013.01); *H04L 27/3872* (2013.01); *H04L 25/03121* (2013.01); *H04L 2025/0342* (2013.01); *H04L 2027/0018* (2013.01); *H04L 2027/0028* (2013.01)

(56) References Cited

U.S. PATENT DOCUMENTS

2007/0281640 A1\* 12/2007 Coupain et al. ............... 455/130
2013/0322870 A1\* 12/2013 Geyer et al. ..................... 398/25

OTHER PUBLICATIONS

PCT Written Opinion, mailed May 21, 2013, in connection with International Application No. PCT/EP2012/063386, all pages.
International Preliminary Report on Patentability, mailed Jun. 18, 2014, in connection with International Application No. PCT/EP2012/063386, all pages.

\* cited by examiner

DEVICE FOR CARRIER PHASE RECOVERY

TECHNICAL FIELD

The present invention discloses a transmitter and a receiver for improved carrier phase recovery.

BACKGROUND

Commercial communication systems today strive for the highest possible spectral and power efficiency at the lowest possible cost, complexity and overall energy consumption. In order to reach the high spectral efficiencies required to support the necessary data rates in networks today, phase-coherent signaling are often used, especially in microwave backhaul systems which operate at a high signal to noise ratio, SNR.

As an example, consider the single carrier system 100 for phase-coherent signaling shown in FIG. 1. The system 100 is a transmitter-receiver chain, where the transmitter 20 receives a baseband signal, BB, which is modulated in a modulator 10, filtered in a low pass filter 11, and then "up-converted" to radio frequency, RF, in a transmitter unit Tx 12 by means of a transmit oscillator, before being transmitted by means of a transmitter antenna 21. The receiver 23 receives the transmitted signal via a receiver antenna 22, "down-converts" it to a lower frequency by means of a receiver oscillator comprised in a receive unit Rx 13, filtered in a low-pass filter 14, passed through a carrier recovery unit 15, which is connected to a detector 16, and finally demodulated in a demodulator 17, so that the BB signal which was input to the transmitter unit 20 is recovered on the receiver side.

The systems 100 performance in terms of data throughput and bit error rate, BER, is in practice limited by non-ideal physical components in both the transmitter and in the receiver. Examples of degrading factors introduced by non-ideal components include additive noise, introduced mainly by electrical components in the receiver 22, and phase noise introduced mainly by imperfections in the oscillators which are included in the transmit unit Tx 12 and in the receive unit Rx 13.

Regarding the terms "additive noise" and "phase noise" which have been used above, these terms are here used in the sense that additive noise is noise that adds to the amplitude and phase of the signal, while phase noise is noise that adds to the phase of the signal. Phase noise and additive noise are accumulated throughout the communication system, and are quantified at the output of the receive unit Rx 205.

The additive noise in the system 100 is suppressed to some extent by means of passive matched filtering at the transmitting and the receiving ends of the system. The phase noise, on the other hand, is compensated for actively by some type of phase tracking system or carrier recovery unit, where well-known methods for carrier recovery include Phase Locked Loop (PLL) based approaches and Kalman filtering.

The modulator 10 and the demodulator 17 of FIG. 1 may be a "mapper" and a corresponding "demapper" for a 1024-QAM constellation, as an alternative to which the information carried in the phase of the signal could be differentially encoded and then demodulated. Compared to a directly modulated QAM-signal that carries information in amplitude and instantaneous phase, a differentially encoded signal carries information directly in amplitude but in the difference in phase between consecutive symbols. In such systems, the accumulated random fluctuations in phase caused by non-ideal oscillators do not need to be tracked over time, since the cumulative phase noise process is absorbed by the differential encoding of the signal.

Significant efforts have been spent in trying to improve algorithms and methods for carrier recovery, the reason being that the better the carrier recovery algorithm performs, the less expensive and power consuming oscillators can be used in the system. These efforts have resulted in algorithms with high performance, but also with high complexity as compared to the low complexity classic methods based on, e.g., PLLs. Hence, the performance problem associated with "legacy" carrier recovery methods has been alleviated, while introducing complexity issues.

A drawback of many advanced systems for carrier recovery based on, e.g., the expectation maximization (EM) method or factor graph methods is that they rely on stochastic models of the system. If such models are not correct, then the stability of the entire communication system is at risk.

Another drawback associated with most carrier recovery methods is that they compute (often iteratively) a phase estimate based on an error signal that is derived from detecting the transmitted data. Hence, they require knowledge of, e.g., the modulation format and rate that is used for communication. Also, detection errors will affect the quality of the error signal, and may lead to an error prone system or to system instability.

A differentially encoded and demodulated communication system is, as noted above, much less sensitive to phase fluctuation. However, in a typical differentially demodulating receiver, it can be shown that a signal to noise ratio, SNR, penalty of 3 dB is incurred in the phase channel.

SUMMARY

It is an object of the present invention to obviate the need for carrier recovery methods. This need is obviated by means of a transmitter and a receiver, either of which can be used as "stand alone" units, but which also give rise to particularly beneficial effects when used together. Both the transmitter and the receiver comprise inventive filters, with a first kind of filter in the transmitter and a corresponding second kind of filter in the receiver.

In addition, the same beneficial effects will also be obtained if the filters are used in the "reverse order", i.e. if the second kind of filter is used in the transmitter and the first kind of filter is used in the receiver.

Thus, although particularly beneficial effects are obtained if the first and second kind of filters are used together, with one filter of each kind at each end of a transmitter-receiver chain, it has also been observed that the filters give rise to beneficial effects if used on their own, i.e. a transmitter or a receiver with either kind of filter will also be of use.

Thus, the invention discloses a transmitter which comprises a baseband modulator which is arranged to modulate a complex baseband signal and to output, at point n in time, a complex modulated signal $x_{in}(n)$ with amplitude g and phase q, i.e. $x_{in}(n) = g(n)e^{jq(n)}$, to the input port of a filter.

The filter, in turn, has its output coupled to a transmit unit, and the filter is arranged to output, at point n in time, a filtered complex output signal $x_{out}(n)$ with amplitude g but phase m, i.e. $x_{out}(n) = g(n)e^{jm(n)}$, so that the filter is arranged to affect the phase but not the amplitude of its input signal.

The filter is arranged to have as its transfer function for the phase of its input signal the z-transform $F(z) = 1 + wz^{-1}$, where w is a weighting function whose value is determined by means of the additive noise autocorrelation, the phase noise autocorrelation and the signal amplitude of $x_{in}$.

There is also disclosed a receiver which comprises a receive unit whose output is connected to a filter. The filter, in turn, has its output coupled to a detector unit which is connected to a demodulator, and the filter is arranged to receive a complex input signal $x_{in}(n)=g(n)e^{jq(n)}$ from the receiver unit at point n in time, and to output, at point n in time, a filtered complex output signal $x_{out}(n)=g(n)e^{jm(n)}$, so that the filter is arranged to affect the phase but not the amplitude of its input signal.

The filter is arranged to have as its transfer function for the phase of its input signal the z-transform $F(z)=1+wz^{-1}$, where w is a weighting function whose value is determined by means of the additive noise autocorrelation, the phase noise autocorrelation and the signal amplitude of $x_{in}$.

In addition, there is disclosed a transmitter which comprises a baseband modulator which is arranged to modulate a complex baseband signal and to output, at point n in time, a complex modulated signal $x_{in}(n)$ with amplitude g and phase q, i.e. $x_{in}(n)=g(n)e^{jq(n)}$ to the input port of a filter.

The filter, in turn, has its output coupled to a transmit unit, and the filter is arranged to output, at point n in time, a filtered complex output signal $x_{out}(n)$ with amplitude g and phase m, i.e. $x_{out}(n)=g(n)e^{jm(n)}$, so that the filter is arranged to affect the phase but not the amplitude of its input signal.

The filter is arranged to have as its transfer function for the phase of its input signal the inverse of the z-transform $F(z)=1+wz^{-1}$, where w is a weighting function whose value is determined by means of the additive noise autocorrelation, the phase noise autocorrelation and the signal amplitude of $x_{in}$.

There is also disclosed a receiver which comprises a receive unit whose output is connected to a filter, where the filter in turn has its output coupled to a detector unit which is connected to a demodulator.

The filter is arranged to receive a complex input signal $x_{in}(n)=g(n)e^{jq(n)}$ from the receiver unit at point n in time, and to output, at point n in time, a filtered complex output signal $x_{out}(n)=g(n)e^{jm(n)}$, so that the filter is arranged to affect the phase but not the amplitude of its input signal.

The filter is arranged to have as its transfer function for the phase of its input signal the inverse of the z-transform $F(z)=1+wz^{-1}$, where w is a weighting function whose value is determined by means of the additive noise autocorrelation, the phase noise autocorrelation and the signal amplitude of $x_{in}$.

BRIEF DESCRIPTION OF THE DRAWINGS

The invention will be described in more detail in the following, with reference to the appended drawings, in which.

DETAILED DESCRIPTION

Figure 1:
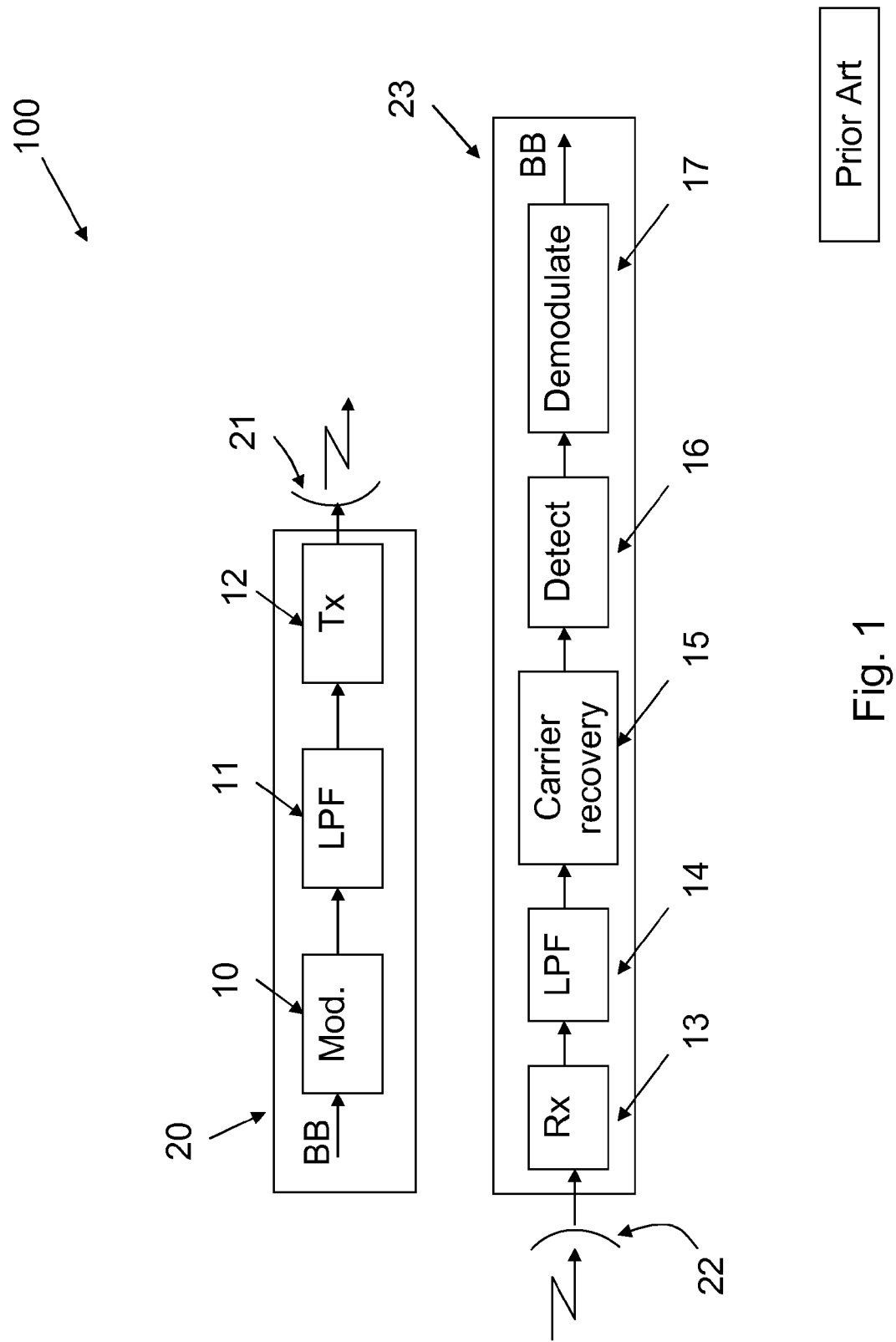
FIG. 1 shows an embodiment of a prior art transmitter-receiver system.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

A principle of the invention is the use of a certain first kind of, and another principle is the use of a certain second kind of filter. These two filters can either be used as "stand-alone", either in a transmitter or in a receiver, or in combination with each other in a transmitter-receiver chain. Both kinds of filter are thus suited for use in either a transmitter or a receiver.

The first kind of filter can be seen as a kind of so called Moving Average filter, an MA filter, and will in places in the following be referred to as "the MA filter", while the second kind of filter can be seen as a kind of Auto Regressive filter, an AR filter, and will in places below be referred to as "the AR filter".

In the description below, the use of both kinds of filters, MA and AR, will first be shown in both a transmitter and in a receiver, following which a detailed description of the filters' exact function will be given. A description of transmitter-receiver chains with the combinations of AR-MA and MA-AR filters will then be given, following which a more detailed description of the reasons that these filters give rise to advantageous effects will be given.

Figure 2:
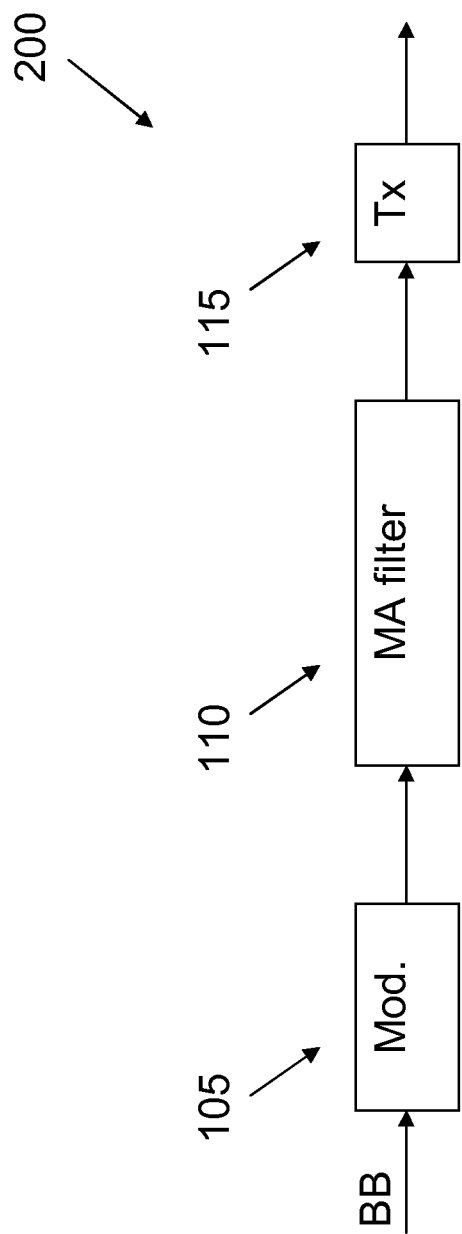
FIG. 2 shows an embodiment of a transmitter.

FIG. 2 shows an embodiment of a transmitter 200. The transmitter 200 comprises a modulator 105, which, for example, can be an OFDM modulator or a modulator for non-QAM constellations. As shown in FIG. 2, the modulator 105 is arranged to receive as its input a baseband data stream, BB, which the modulator 105 is arranged to modulate. The output from the modulator 105 is used as input to an MA filter 110.

The modulated and filtered signal which is output from the MA filter 110 is used as input to a transmit unit Tx 115. A main function of the Tx unit 115 is to convert the frequency of the input signal to RF frequency, with the aid of a transmit oscillator which is comprised in the Tx unit 115. The output signal which is generated by the Tx unit 115 is suitably used as input signal to a transmit antenna (not shown in FIG. 2).

Figure 3:
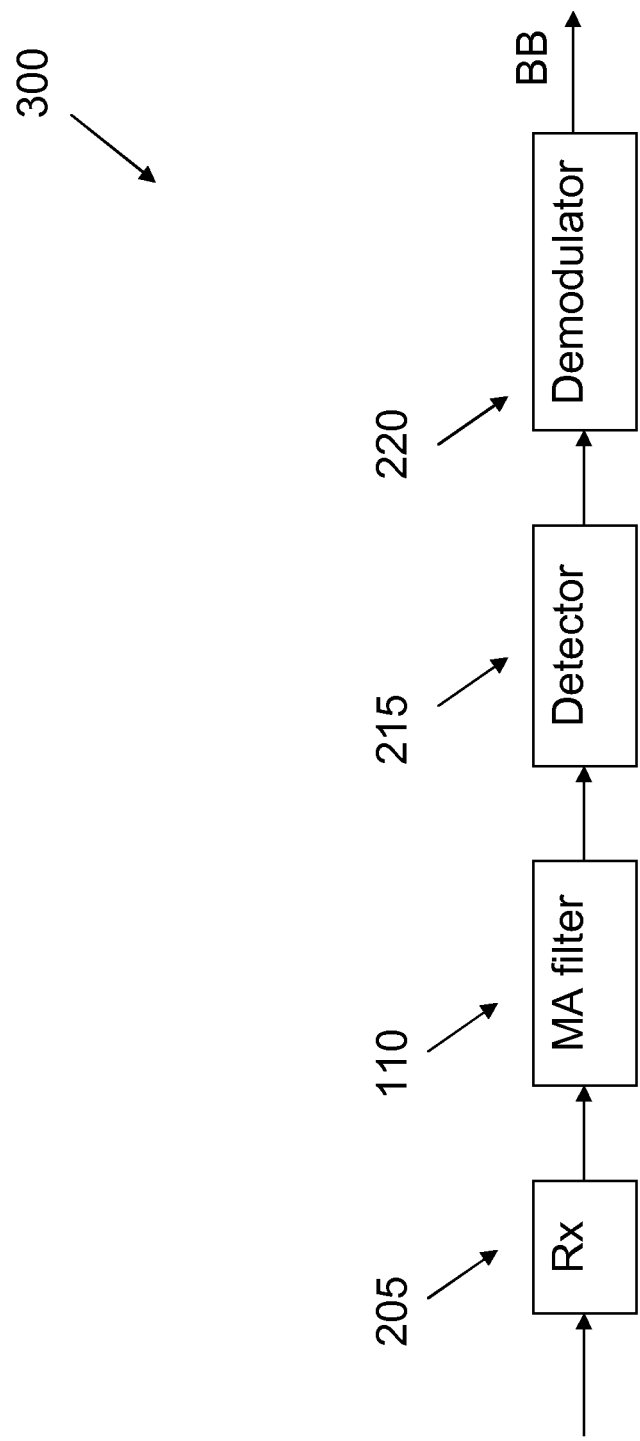
FIG. 3 shows an embodiment of a receiver.

FIG. 3 is used to show that the MA filter 110 described above can be used in a receiver 300 as well as in a transmitter. The receiver 300 comprises a receive unit Rx 205 which is arranged to receive as its input the signal from an antenna (not shown in FIG. 3). A main function of the Rx unit 205 is to "down-convert" the received signal from RF frequency to a lower frequency, suitably a modulated baseband signal, which is usually done by means of a receiver oscillator which is comprised in the Rx unit 205.

In the receiver 300, the MA filter 110 is arranged to receive as its input the modulated baseband signal from the Rx unit 205, and to output the filtered signal to a detector 215. The output signal from the detector 215 is used as input signal to a demodulator 220, which demodulates the signal so that the baseband signal which is contained in the signal received by the antenna is recreated.

Turning now to a more detailed description of the function of the MA filter 110, this is as follows:

A purpose of the MA filter 110 is to suppress autocorrelation in the phase noise and white noise processes at the input to the detector 215. Given a complex input signal $x_{in}(n)$ to the MA filter 110 with amplitude g and phase q, i.e. $x_{in}(n)=g(n)e^{jq(n)}$, the MA filter is arranged to have as its output signal at point n in time a filtered complex output signal $x_{out}(n)$ with amplitude g and phase m, i.e. $x_{out}(n)=g(n)e^{jm(n)}$. In other words, the MA filter 110 is arranged to only affect the phase q of its input signal, while leaving the amplitude g intact.

The transfer function of the MA filter 110 is defined by the z-transform $F(z)=1+w[n]z^{-1}$.

W is a weighting function whose value is determined by means of the additive noise auto correlation in the output from the receive unit 205, the phase noise autocorrelation in the output from the receive unit 205 and the signal amplitude of $x_{in}(n)$.

An example of the weighting function w[n], derived for the case of additive white Gaussian noise with variance $\sigma_w^2$ and a random walk (Wiener) process phase noise with innovation variance $\sigma_\Delta^2$, is as follows:

$$w[n] = -\frac{\sigma_{N[n-1]}^2}{\sigma_{Z[n-1]}^2}$$

$$\sigma_{N[n]}^2 = \frac{\sigma_w^2}{2|x_{in}[n]|}$$

$$\sigma_{Z[n]}^2 = \sigma_{N[n]}^2 + \sigma_{N[n-1]}^2 + \sigma_\Delta^2 - \frac{\sigma_{N[n-1]}^4}{\sigma_{Z[n-1]}^2}$$

Regarding the terms "phase noise" and "additive noise" which have been used above, these terms are here used in the sense that phase noise is noise that adds to the phase of the signal, and additive noise is noise that adds to the amplitude and phase of the signal. Phase noise and additive noise are accumulated throughout the communication system, and are quantified at the output of the receive unit Rx 205.

Figure 4:
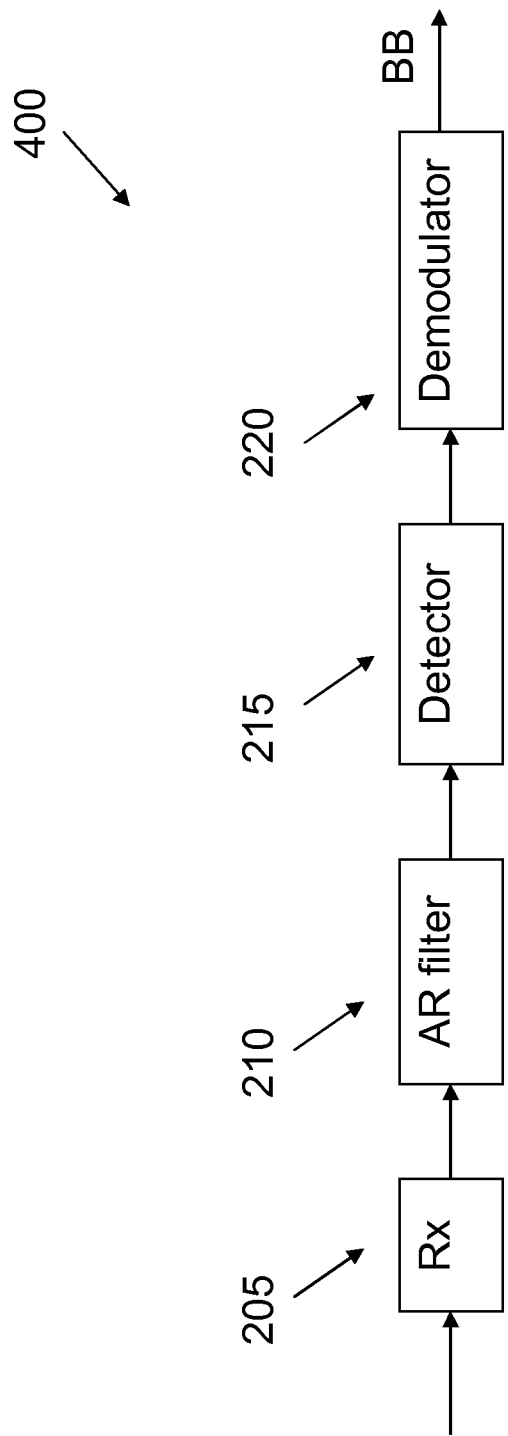
FIG. 4 shows an embodiment of a receiver.

FIG. 4 shows an embodiment of a receiver 400. The receiver 400 comprises a receive unit Rx 205, which has already been described above in connection with FIG. 3. The receiver 400 also comprises an AR filter 210, which is arranged to receive as its input the modulated baseband signal from the Rx unit 205, and to output a filtered signal to a detector 215. The output signal from the detector 215 is used as input signal to a demodulator 220, which demodulates the signal so that the baseband signal which is contained in the signal received by the antenna is recreated. The detector 215 decides which symbol that has been received, and the demodulator 220 converts such symbols into data, i.e. into binary digits, "bits".

Figure 5:
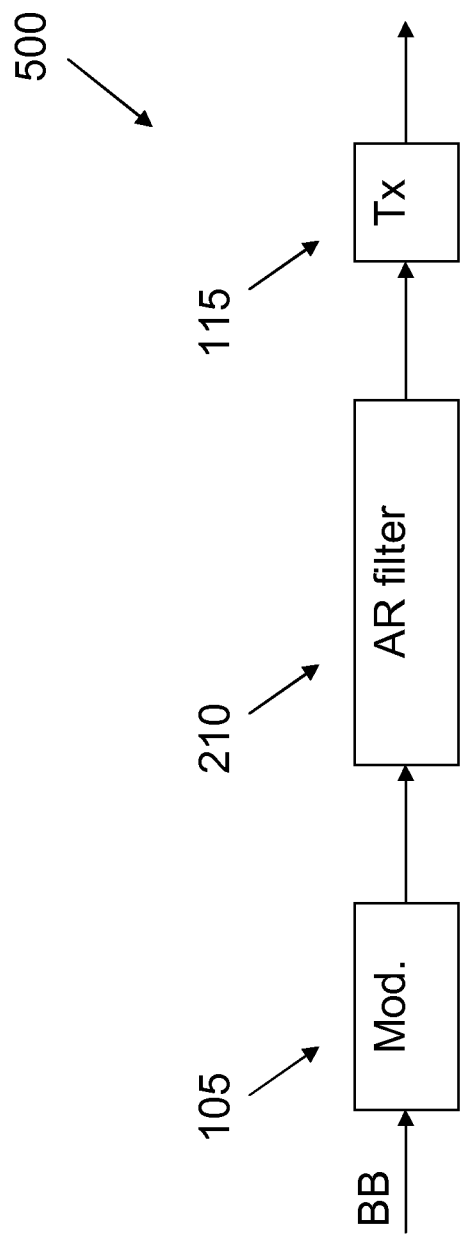
FIG. 5 shows an embodiment of a transmitter.

FIG. 5 is used to show that the AR filter 210 can also be used in a transmitter 500, which corresponds to the transmitter 200 of FIG. 2, with the exception of the AR filter 210.

Turning now to a detailed description of the AR filter 210, this is as follows: given a complex input value $x_{in}(n)$ at point n in time, where $x_{in}(n)$ has the amplitude g and phase q, i.e. $x_{in}(n)=g(n)e^{jq(n)}$, the output signal of the filter 210 at point n in time, i.e. $x_{out}[n]$ of the AR filter 210 has the same amplitude as the input signal but the phase m, i.e. $x_{out}(n)=g(n)\,e^{jm(n)}$. This can also be seen as saying that the AR filter 210 is arranged to affect the amplitude but not the phase of an input signal.

The effect of the filter 210 on the phase q(n) of its input signal is defined by the filter's transfer function, which is arranged to be the inverse of the z-transform $F(z)=1+wz^{-1}$, where w is a weighting function whose value is determined by means of the additive noise autocorrelation in the output from the receive unit 205, the phase noise autocorrelation in the output from the receive unit 205 and the signal amplitude of $x_{in}$, i.e. g(n).

An example of the weighting function w[n], derived for the case of additive white Gaussian noise with variance $\sigma_w^2$ and a Wiener process phase noise with innovation variance $\sigma_\Delta^2$, is:

$$w[n] = -\frac{\sigma_{N[n-1]}^2}{\sigma_{Z[n-1]}^2}$$

$$\sigma_{N[n]}^2 = \frac{\sigma_w^2}{2|x_{in}[n]|}$$

$$\sigma_{Z[n]}^2 = \sigma_{N[n]}^2 + \sigma_{N[n-1]}^2 + \sigma_\Delta^2 - \frac{\sigma_{N[n-1]}^4}{\sigma_{Z[n-1]}^2}$$

Although, as mentioned, the AR filter 210 and the MA 110 filter can be used as "stand-alone" filters in a receiver or in a transmitter, they are also particularly well suited for use together, with one filter of each kind at each end of a transmitter-receiver chain, due to the fact that the transfers functions' of these filters represent each others' inverse functions.

Figure 6:
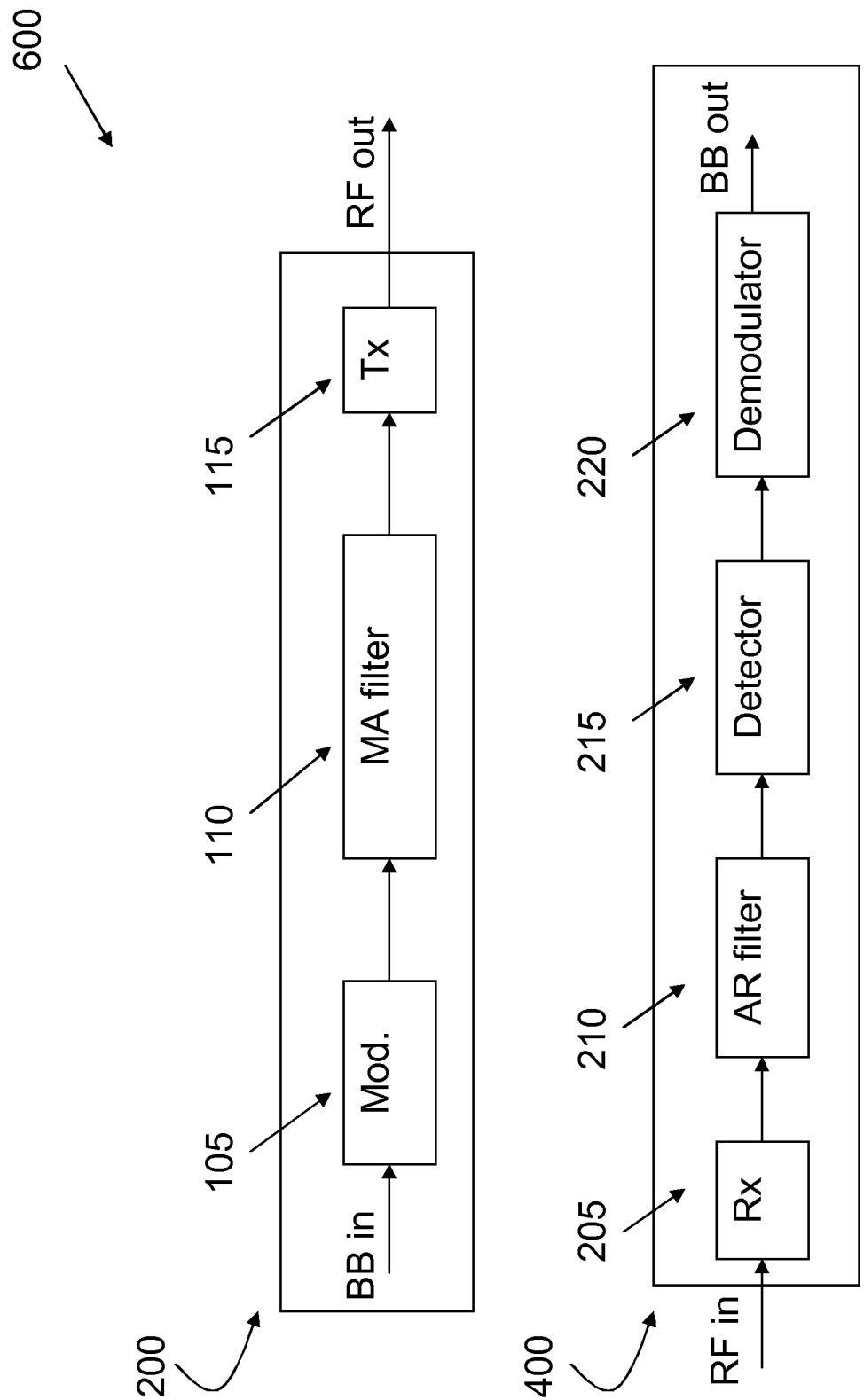
FIGS. 6-9 show embodiments of transmitter-receiver systems.
Figure 7:
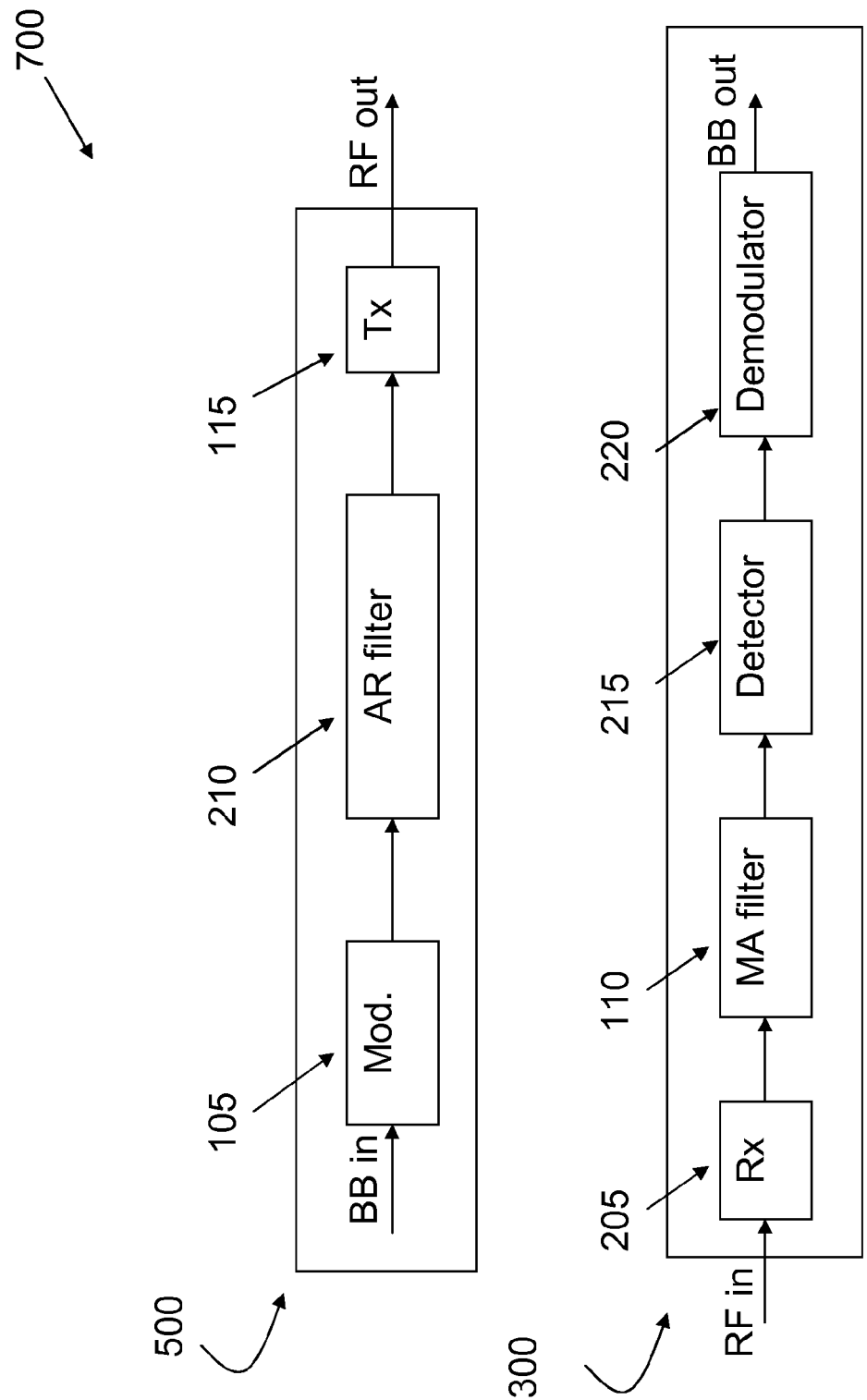

The use of one filter of each kind at either end of a transmitter-receiver chain is illustrated in FIGS. 6 and 7, with FIG. 6 showing a transmitter-receiver chain 600, where the transmitter is the transmitter 200 from FIG. 2, i.e. a transmitter with the MA filter 110, and the receiver is the receiver 400 from FIG. 4, i.e. a receiver with the AR filter 210.

Similarly but conversely, FIG. 7 shows a transmitter-receiver chain 700, where the transmitter is the transmitter 500 from FIG. 5, i.e. a transmitter with the AR filter 210, and the receiver is the receiver 300 from FIG. 3, i.e. a receiver with the MA filter 110.

Figure 8:
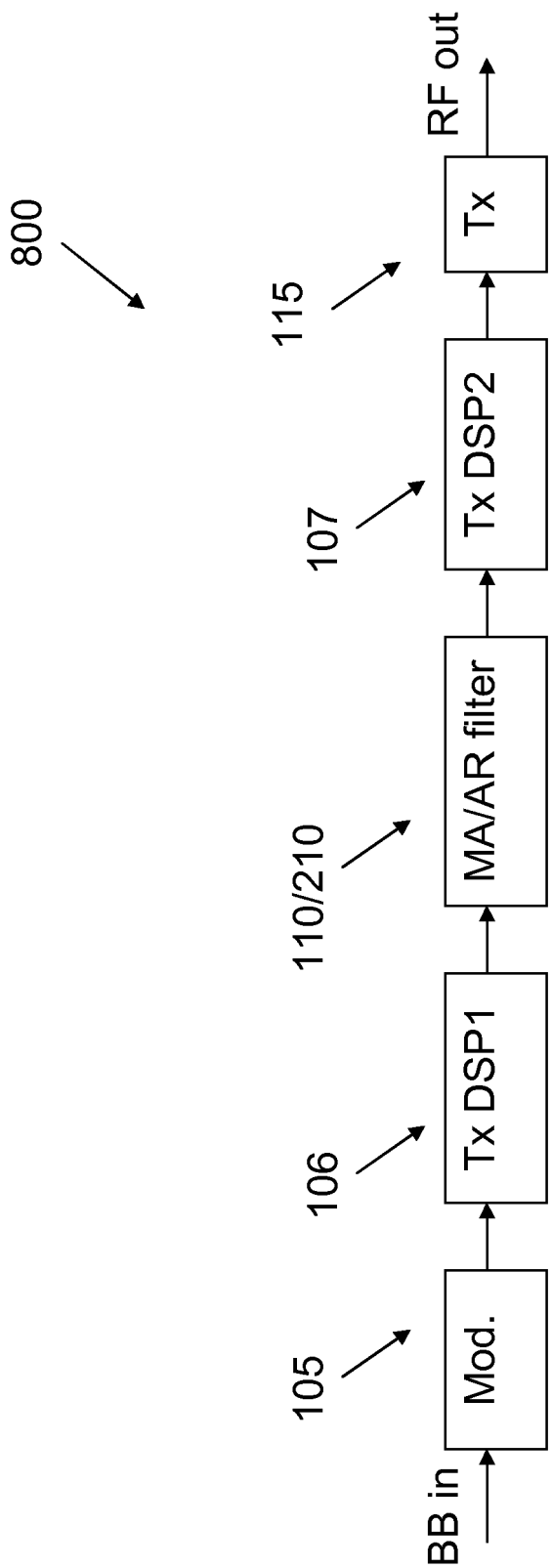
Figure 9:
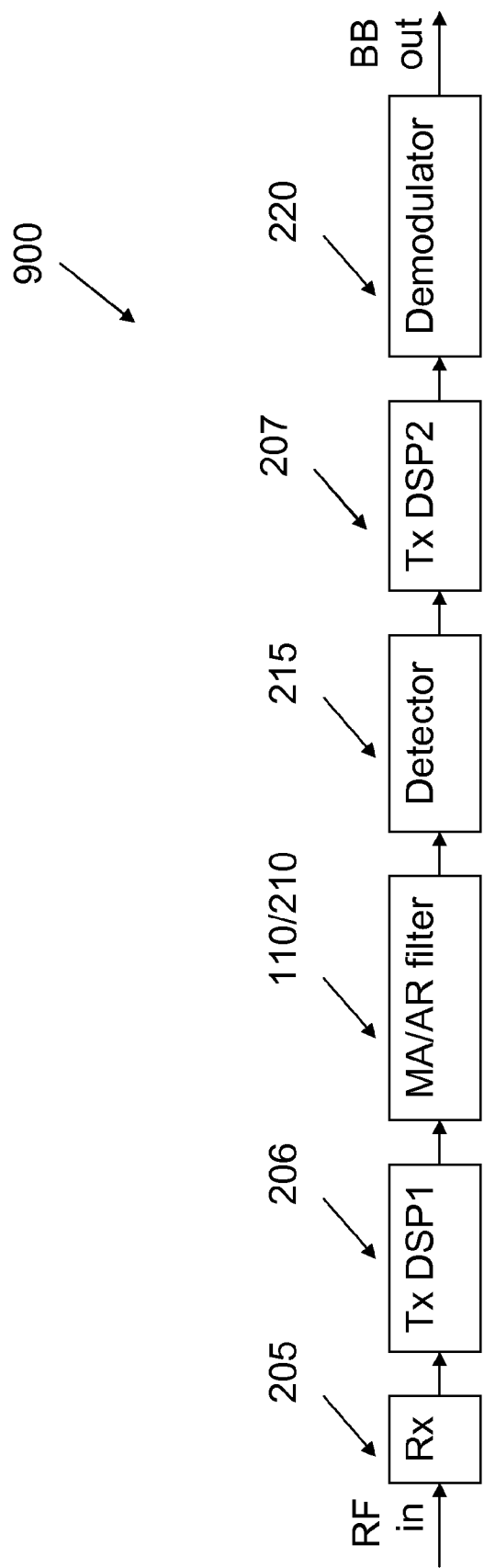

FIGS. 8 and 9 show further embodiments of a transmitter 800 and a receiver 900: the transmitter 800 is based on the transmitters 200 and 500, i.e. a transmitter with an MA filter 110 or an AR filter 210, and similarly, the receiver 900 is based on the receivers 300 and 400, i.e. a receiver with an MA filter 110 or an AR filter 210.

However, in the cases of the transmitter 800 and the receiver 900, there is also comprised a signal processing unit on either side of the MA/AR filter, shown as Tx DSP1 and Tx DSP 2 in FIG. 8, and Rx DSP 1 and Rx DSP 2 in FIG. 9. The role of these signal processing units is to handle hardware imperfections other than phase noise, including for example, DC errors, quadrature errors, frequency selective fading channels and frequency errors.

It should be emphasized that although the signal processing units are shown in FIGS. 8 and 9 as "DSP", which is usually used to signify Digital Signal Processing, the processing performed in these units can also be performed in analogue technology, so the abbreviation DSP should be seen as an example only, and should not be used to interpret the designs of FIGS. 8 and 9 to be limited to digital technology. The same is true for all of the embodiments shown in FIGS. 2-9: all of these embodiments can be designed either in digital or in analogue technology, or in a combination of digital and analogue technology.

The AR filter 210 and the MA filter 110 can also be used in one and the same radio unit, if the radio unit has both a transmitter and a receiver, as is common with many kinds of, for example, microwave radio links. In this case, the choice of AR/MA filter in the transmitter/receiver of the radio unit would depend on the radio unit at the other end of "the radio hop". Four combinations arise, as follows: consider a "radio hop" which uses Radio Unit 1 below at one end and Radio Unit 2 below at the other end. The table below then shows (read horizontally across) which combinations of filters in the respective transmit and receive filters that would give rise to particularly beneficial effects due to the combinations of AR-MA filters:

| Filter, Radio Unit 1 | | Filter, Radio Unit 2 | |
|---|---|---|---|
| Transmit | Receive | Transmit | Receive |
| MA | MA | AR | AR |
| AR | AR | MA | MA |
| AR | MA | AR | MA |
| MA | AR | MA | AR |

Thus, the invention also encompasses radio units with the following four combinations of transmitter and receiver units, with the reference numbers used previously in this text and in the drawings:

| | Transmitter Unit | Receiver Unit |
|---|---|---|
| Radio Unit 1 | 200 | 300 |
| Radio Unit 2 | 500 | 400 |
| Radio Unit 3 | 500 | 300 |
| Radio Unit 4 | 200 | 400 |

Turning now to a more detailed description of the beneficial effects given by the AR and MA filters, and the particularly beneficial effects given by the combination of these filters, the following can be said:

An invertible operation can be shown to preserve the mutual information between transmitter and receiver. As such, an invertible operation does not reduce the receiver's possibility to make a correct detection of transmitted data.

An example of an invertible operation is a moving average MA filter. Since differential demodulation can be represented as MA filtering, it is realized that it is possible to design a differentially decoding receiver with equal performance in terms of detection capability to a system without a differentially decoded phase.

Let the total system phase perturbation at point n in time due to the Tx and Rx oscillators in a system such as the one 100 of FIG. 1 be described by:

$$\phi_S[n]=\phi_S[n-1]+\Delta[n]$$

where $\phi_S[n]=\phi_{Tx}[n]+\phi_{Rx}[n]$, and $\Delta[n]$ is an incremental phase noise term often called the innovation variable. If we assume that the oscillators can be modeled as Wiener processes, $\Delta[n]$ above is AWGN (Additive White Gaussian Noise), which is assumed throughout this text. It should however be understood that an extension of this explanation to the case of "non-white" $\Delta[n]$ is also possible.

The effect of adding an MA filter to one end of a communication system and a corresponding inverse operation (AR filter) at the other end in order to recover the transmitted phase information is to move time-correlation from the phase noise term to the white noise term in the received samples. To see this, let $$\phi_I[n]=\phi_I[n-1]+I[n],$$

be the transmitted phase and $I[n]$ the encoded information in the phase channel. Then $\arg(r[n])$, the phase of the received down-converted signal r at time n, is:

$$\arg(r[n])=\phi_S[n]+\phi_I[n]+\arg(w_n), \text{ and}$$

$$\arg(r[n])-\arg(r[n-1])=I[n]+\Delta[n]+\arg(w_n)-\arg(w_{n-1})$$

The stochastic term $\Delta[n]$ is now AWGN, while $\arg(w_n)-\arg(w_{n-1})$ is correlated in time (between successive detections of $I[n]$). However, the stochastic properties of this correlated noise term are well known, and an optimal or near-optimal whitening filter, such as the combination of the AR-MA filters described above, can be designed to suppress this noise. Such a "whitening" filter assumes the role of the carrier recovery algorithm but with considerably less complexity.

In summary, although the use of either of the filters (AR/MA) shown above gives rise to beneficial effects on their own, the use of the combination of MA-AR/AR-MA filters voids the need for advanced carrier recovery algorithms by insertion of a mutual information preserving operation (an MA/AR-filter) at the channel output, i.e., receiver front end, and the corresponding inverse (AR/MA) filtering at the transmit side. The resulting system is an "AR-MA" or "MA-AR" filter distributed between the transmitter and the receiver, as shown in FIGS. 6-9.

Figure 10:
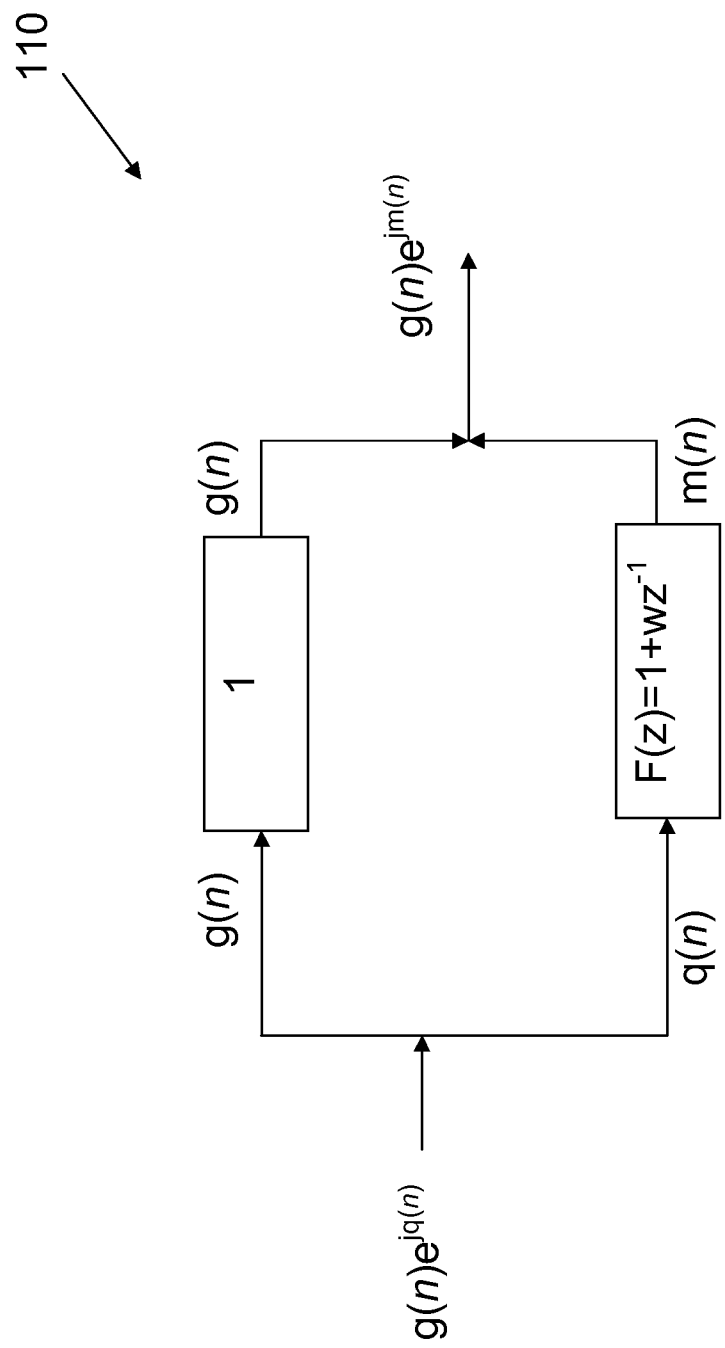
FIG. 10 shows a filter principle.

Finally, reference will be made to FIG. 10 in order to further illustrate the notion of a filter that is arranged to affect the phase but not the amplitude of an input complex signal $x_{in}(n)=g(n)e^{jq(n)}$. Thus, FIG. 10 shows a schematic view of a possible embodiment of the MA filter 110, which receives, at point n in time, an input signal $x_{in}(n)=g(n)e^{jq(n)}$. Figuratively, as shown in FIG. 10, the filter 110 separates the phase q(n) and the amplitude g(n) from each other, and processes them separately: the amplitude g(n) is multiplied by 1, i.e. kept intact, while the phase is processed by means of a filter component that has as its transfer function the z-transform $F(z)=1+wz^{-1}$. The z transform has the effect on the phase g(n) of turning it into the phase m(n), following which the phase and amplitude are again "reassembled" into a new complex output function $x_{out}(n)=g(n)e^{jm(n)}$.

It will be realized that the AR filter 210 functions in a similar manner, although the actual filter function as such is the inverse of that shown in FIG. 10.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A transmitter-receiver chain comprising a differentially encoding transmitter and a differentially decoding receiver, the differentially encoding transmitter comprising a baseband modulator arranged to modulate a complex baseband signal and to output, at point n1 in time, a complex modulated signal $x1_{in}(n1)$ with amplitude g1 and phase q1, $x1_{in}(n1)=g1(n1)e^{jq1(n1)}$, to an input port of a first filter, the first filter in turn having its output coupled to a transmit unit, said first filter being arranged to output, at point n1 in time, a filtered complex output signal $x1_{out}(n1)$ with amplitude g1 and phase m1, $x1_{out}(n1)=g1(n1)e^{jm1(n1)}$, so that the first filter is arranged to affect the phase but not the amplitude of its input signal, the first filter being arranged to have as its transfer function for the phase of its input signal a z-transform $F(z)=1+wz^{-1}$, the differentially decoding receiver comprising a receive unit whose output is connected to a second filter, the second filter in turn having its output coupled to a detector unit which is connected to a demodulator, said second filter being arranged to receive from the receiver unit at point n2 in time a complex input signal $x2_{in}(n2)=g2(n2)e^{jq2(n2)}$, and to output, at point n2 in time, a filtered complex output signal $x2_{out}(n2)=g2(n2)e^{jm2(n2)}$, so that the second filter is arranged to affect the phase but not the amplitude of its input signal, the second filter being arranged to have as its transfer function for the phase of its input signal an inverse of the z-transform $F(z)=1+wz^{-1}$, w being a weighting function whose value is determined based on an additive noise autocorrelation, a phase noise autocorrelation and the signal amplitude of $x1_{in}$.

2. A differentially encoding transmitter comprising a baseband modulator arranged to modulate a complex baseband signal and to output, at point n in time, a complex modulated signal $x_{in}(n)$ with amplitude g and phase q, $x_{in}(n)=g(n)e^{jq(n)}$, to an input port of a filter, the filter in turn having its output coupled to a transmit unit, said filter being arranged to output, at point n in time, a filtered complex output signal $x_{out}(n)$ with amplitude g and phase m, $x_{out}(n)=g(n)e^{jm(n)}$, so that the filter is arranged to affect the phase but not the amplitude of its input signal, the filter being arranged to have as its transfer function for the phase of its input signal a z-transform $F(z)=1+wz^{-1}$, with w being a weighting function whose value is determined by means of an additive noise autocorrelation, a phase noise autocorrelation and the signal amplitude of $x^{in}$.

3. The differentially encoding transmitter according to claim 2, wherein the baseband modulator is configured to output a differentially encoded complex modulated signal $x_{in}(n)$.

4. The differentially encoding transmitter according to claim 2, wherein the additive noise has variance $\sigma_w^2$ and the phase noise is a random walk process with innovation variance $\sigma_\Delta^2$, and wherein w, as a function of n, is given by:

$$w[n] = -\frac{\sigma_{N[n-1]}^2}{\sigma_{Z[n-1]}^2}$$

$$\sigma_{N[n]}^2 = \frac{\sigma_w^2}{2|x_{in}[n]|}$$

$$\sigma_{Z[n]}^2 = \sigma_{N[n]}^2 + \sigma_{N[n-1]}^2 + \sigma_\Delta^2 - \frac{\sigma_{N[n-1]}^4}{\sigma_{Z[n-1]}^2}.$$

5. A differentially decoding receiver comprising a receive unit whose output is connected to a filter, the filter in turn having its output coupled to a detector unit which is connected to a demodulator, said filter being arranged to receive from the receiver unit at point n in time a complex input signal $x_{in}(n)=g(n)e^{jq(n)}$), and to output, at point n in time, a filtered complex output signal $x_{out}(n)=g(n)e^{jm(n)}$, so that the filter is arranged to affect the phase but not the amplitude of its input signal, the filter being arranged to have as its transfer function for the phase of its input signal an inverse of the z-transform $F(z)=1+wz^{-1}$, with w being a weighting function whose value is determined by means of an additive noise autocorrelation, a phase noise autocorrelation and the signal amplitude of $x_{in}$.

6. The differentially decoding receiver according to claim 5, wherein the detector unit is configured to differentially decode the filtered complex output signal.

7. The differentially decoding receiver according to claim 5, wherein the additive noise has variance $\sigma_w^2$ and the phase noise is a random walk process with innovation variance $\sigma_\Delta^2$, and wherein w, as a function of n, is given by:

$$w[n] = -\frac{\sigma_{N[n-1]}^2}{\sigma_{Z[n-1]}^2}$$

$$\sigma_{N[n]}^2 = \frac{\sigma_w^2}{2|x_{in}[n]|}$$

$$\sigma_{Z[n]}^2 = \sigma_{N[n]}^2 + \sigma_{N[n-1]}^2 + \sigma_\Delta^2 - \frac{\sigma_{N[n-1]}^4}{\sigma_{Z[n-1]}^2}.$$

\* \* \* \* \*